US008961181B2

(12) United States Patent
Dakin et al.

(10) Patent No.: US 8,961,181 B2
(45) Date of Patent: Feb. 24, 2015

(54) LDV SYSTEM FOR IMPROVING THE AIM OF A SHOOTER

(75) Inventors: Elizabeth A. Dakin, Great Falls, VA (US); Priyavadan Mamidipudi, Bristow, VA (US); Philip L. Rogers, Hume, VA (US); Daniel C. Dakin, Great Falls, VA (US)

(73) Assignee: Optical Air Data Systems, LLC, Manassas, VA (US)

( * ) Notice: Subject to any disclaimer, the term of this patent is extended or adjusted under 35 U.S.C. 154(b) by 126 days.

(21) Appl. No.: 13/476,637

(22) Filed: May 21, 2012

(65) Prior Publication Data

US 2014/0026461 A1    Jan. 30, 2014

Related U.S. Application Data

(60) Provisional application No. 61/579,871, filed on Dec. 23, 2011.

(51) Int. Cl.
*F41G 3/26*   (2006.01)
*G01S 17/66*  (2006.01)
*F41G 3/06*   (2006.01)
(Continued)

(52) U.S. Cl.
CPC . *G01S 17/66* (2013.01); *F41G 3/06* (2013.01); *F41G 3/08* (2013.01); *G01S 17/58* (2013.01); *G01S 17/95* (2013.01)
USPC .......................................................... 434/19

(58) Field of Classification Search
USPC .......... 434/19, 21–23; 42/111, 114, 115, 122, 42/124–126, 142; 235/404; 356/3.01, 3.1
See application file for complete search history.

(56) References Cited

U.S. PATENT DOCUMENTS 4,253,249 A * 3/1981 Ashford et al. ................. 434/22
4,718,121 A   1/1988 Epworth
(Continued)

FOREIGN PATENT DOCUMENTS

CA         2 064 488 C      11/1992
WO   WO 2009/134221 A1    11/2009

OTHER PUBLICATIONS

Frehlich, R., et al., "Effects of Atmospheric Turbulence on Ballistic Testing," *Journal of Applied Meteorology and Climatology* 47:1539-1549, American Meteorological Society, United States (2008).

(Continued)

*Primary Examiner* — Kurt Fernstrom
(74) *Attorney, Agent, or Firm* — Caesar, Rivise, Bernstein, Cohen & Pokotilow, Ltd.

(57) ABSTRACT

Methods and systems for improving the accuracy of hitting a target are described. An apparatus includes a LIDAR unit, a storage device, an aim adjustment controller and an adjustment interface. The LIDAR unit is configured to measure at least one of wind profiles along a path between a shooting device and the target, and a range to the target. The storage device is configured to store ballistic information for at least one of ammunition types, shooting devices, and environmental conditions. The aim adjustment controller is configured to analyze at least one of the wind profile, the range to the target, and the ballistic information to determine a set of aiming parameters and the adjustment interface is configured to provide aiming instructions based on the set of aiming parameters, wherein the aiming instructions substantially improve the accuracy.

25 Claims, 12 Drawing Sheets

(51) Int. Cl.
  *F41G 3/08* (2006.01)
  *G01S 17/58* (2006.01)
  *G01S 17/95* (2006.01)

(56) References Cited

U.S. PATENT DOCUMENTS

| | | | |
|---|---|---|---|
| 4,728,168 A | 3/1988 | Alferness | |
| 4,875,770 A | 10/1989 | Rogers et al. | |
| 5,013,928 A | 5/1991 | Ikeda et al. | |
| 5,194,908 A * | 3/1993 | Lougheed et al. | 356/28 |
| 5,272,513 A | 12/1993 | Vahala et al. | |
| 5,307,197 A | 4/1994 | Tanabe et al. | |
| 5,400,350 A | 3/1995 | Galvanauskas | |
| 5,864,644 A | 1/1999 | DiGiovanni et al. | |
| 6,247,259 B1 | 6/2001 | Tsadka et al. | |
| 6,396,577 B1 | 5/2002 | Ramstack | |
| 6,580,497 B1 | 6/2003 | Asaka et al. | |
| 7,428,253 B2 | 9/2008 | Murison et al. | |
| 7,739,823 B2 | 6/2010 | Shapira et al. | |
| 8,033,464 B2 * | 10/2011 | Windauer et al. | 235/404 |
| 8,046,951 B2 * | 11/2011 | Peters et al. | 42/111 |
| 8,172,139 B1 * | 5/2012 | McDonald et al. | 235/404 |
| 8,196,828 B2 * | 6/2012 | Kelly | 235/404 |
| 8,230,635 B2 * | 7/2012 | Sammut et al. | 42/122 |
| 8,279,287 B2 | 10/2012 | Belenkii | |
| 8,279,423 B2 | 10/2012 | Shapira | |
| 2003/0082502 A1 * | 5/2003 | Stender et al. | 434/23 |
| 2006/0010760 A1 * | 1/2006 | Perkins et al. | 42/142 |
| 2006/0201047 A1 * | 9/2006 | Lowrey, III | 42/122 |
| 2007/0234626 A1 | 10/2007 | Murdock et al. | |
| 2011/0030264 A1 | 2/2011 | Davidson et al. | |
| 2011/0037970 A1 | 2/2011 | Rogers et al. | |
| 2011/0292371 A1 | 12/2011 | Chang | |
| 2012/0206712 A1 | 8/2012 | Rogers et al. | |
| 2012/0274922 A1 * | 11/2012 | Hodge | 356/28 |

OTHER PUBLICATIONS

Co-pending U.S. Appl. No. 13/628,704, inventors Dakin, E. A., et al., filed Sep. 27, 2012.

Request for Re-Examination directed to related Canadian Patent No. 2,124,963, filed Jun. 29, 2012; 34 pages.

Re-Examination Notice directed to related Canadian Patent No. 2,124,963, mailed Oct. 31, 2012, from the Canadian Intellectual Property Office; 4 pages.

Kameyama, S., et al., "Compact all-fiber pulsed coherent Doppler lidar system for wind sensing," Applied Optics, vol. 46, No. 11, Apr. 10, 2007; pp. 1953-1962.

Maeda, M. W., et al., "An Electronically Tunable Fiber Laser with a Liquid-Crystal Etalon Filter as the Wavelength-Tuning Element," IEEE Photonics Technology Letters, vol. 2, No. 11, 1990; 3 pages.

Nilsson, J., "High-power fiber lasers: Surge to power," Stanford Photonics Research Center Annual Meeting, Sep. 19-21, 2005; 55 pages.

* cited by examiner

LDV SYSTEM FOR IMPROVING THE AIM OF A SHOOTER

CROSS REFERENCE TO RELATED APPLICATIONS

This application claims the benefit under 35 U.S.C. §119(e) of U.S. provisional patent application Ser. No. 61/579,871, filed Dec. 23, 2011, which is incorporated by reference herein in its entirety.

BACKGROUND

1. Field

This disclosure relates to a system and a method to measure wind profile for the purpose of improving the aiming accuracy of a shooter.

2. Background Art

Many factors contribute to ballistic aiming accuracy at long distances away from a target. Improving the accuracy is vital for marksman and snipers where often times achieving a "first hit" is the only successful resolution to a situation. An expert sniper can hit a target from 800-1000 yards away. However, if a sniper could accurately engage targets at 2000 yards away, the sniper would be out of the range of most counter-sniper small arms fire and the risk to the shooter would be minimized. As is well known, accuracy diminishes as the shooting distance increases. One reason for the lower accuracy is varying environmental conditions between the sniper and the target that cannot normally be precisely determined.

The use of sensors to measure certain environmental conditions, such as temperature, and humidity, are known to be used to aid a shooter in hitting the target. Other sensors typically utilized by marksman and snipers measure an angle of the weapon with respect to the target and distance to the target. However, there are currently no known sensors to accurately measure wind profile, which is one of the most difficult factors to account for when aligning a target. Wind profile, e.g., direction and speed, may vary along the path between the shooter and the target. The ability for a shooter to also compensate for the wind profile will help to increase the range at which the shooter can accurately hit the target on the first shot.

SUMMARY

What is needed is a system that can measure wind profile at various distances between a first and second point, e.g., a shooter and a target. Furthermore, the system should be able to interface with a storage unit, e.g., a ballistics database, containing information about such factors as ammunition types, environmental data, etc. For example, this information can be used to ultimately provide the shooter with aiming adjustments to give the highest probability of hitting the target on the first shot.

According to a first embodiment of the present invention, there is provided an apparatus for improving accuracy of a shooting device. The apparatus includes a LIDAR unit, a storage device, an aim adjustment controller, and an adjustment interface. The LIDAR unit is configured to measure at least one of a wind profile along a path between the shooting device and a target, and a range to the target. The storage device is configured to store ballistic information for at least one of ammunition types, shooting devices, and environmental conditions. The aim adjustment controller is configured to compute a set of aiming parameters from analyzing at least one of the wind profile, the range to the target, and the ballistic information. The adjustment interface is configured to provide aiming adjustments based on the set of aiming parameters, wherein the aiming adjustments substantially improve the accuracy.

According to a second embodiment of the present invention, there is provided a method for improving accuracy of a shooting device. A beam of radiation is transmitted along a path between the shooting device and a target. Returned radiation is received from one or more regions between the shooting device and the target. Characteristics, for example, wind speed, of the returned radiation are determined. Ballistics information is accessed for at least one of ammunition types, shooting devices, and environmental conditions. A set of aiming parameters is computed based on at least the characteristics of the returned radiation and the ballistics information. Aiming adjustments, based on the set of computed aiming parameters, are provided for the shooting device, wherein the aiming adjustments substantially improve the accuracy.

According to a further embodiment of the present invention, there is provided a LIDAR system coupled to a shooting device. The LIDAR system includes a coherent source configured to produce a coherent radiation beam, a modulator configured to receive the coherent radiation beam as input from the source and to produce a modulated radiation beam, one or more transceivers configured to receive the modulated radiation beam, the one or more transceivers each configured to transmit the modulated radiation beam to a region between the shooting device and a target and to receive a reflected radiation signal from the region between the shooting device and the target, and an optical mixer coupled to the one or more transceivers, and coupled to the coherent source. The optical mixer is configured to receive the one or more reflected radiation signals from the corresponding one or more transceivers, receive one or more reference radiation beams from the coherent source, and determine, for each of the one or more transceivers, a corresponding one or more Doppler shifts based on the respective one or more reference beams and the corresponding one or more reflected radiation signals.

According to a further embodiment of the present invention, there is provided a shooting device. The shooting device includes a body, a barrel, and an aiming system. The aiming system includes a measuring device coupled to the body and includes a LIDAR unit configured to measure at least one of wind profile along a path between the barrel and a target, and a range to the target. The shooting device also includes a storage device electrically coupled to the measuring device and configured to store ballistic information. The shooting device further includes an aim adjustment controller configured to analyze at least one of the wind profile, the range to the target, and the ballistic information to determine aiming parameters for the aiming device.

Further features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWING(S)/FIGURE(S)

The accompanying drawing(s), which are incorporated herein and form part of the specification, illustrate the present invention and, together with the description, further serve to explain the principles of the invention and to enable a person skilled in the relevant art(s) to make and use the invention.

Figure 7:
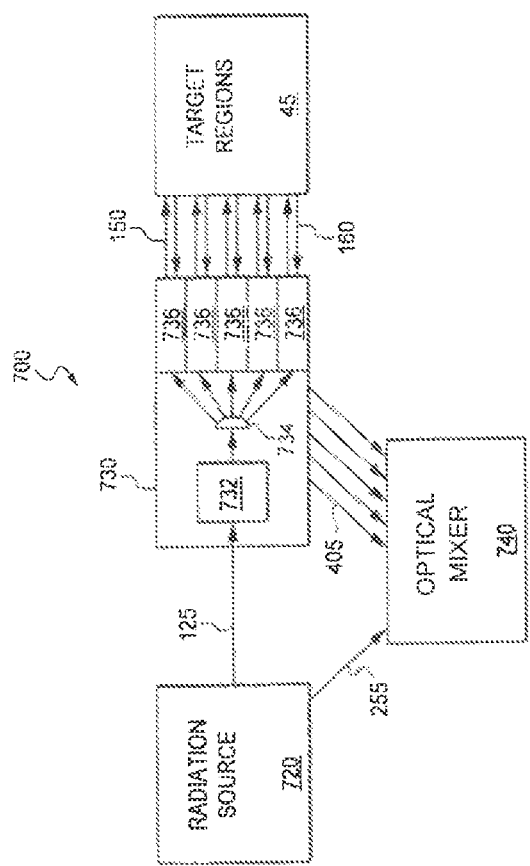
Figure 8:
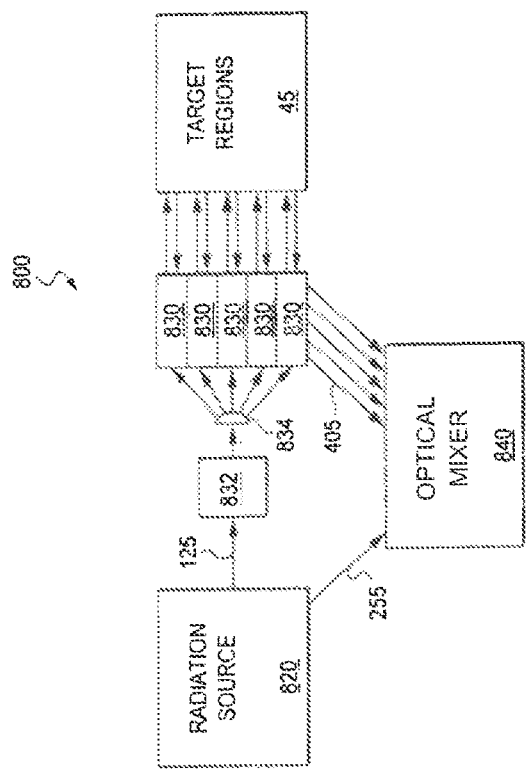
Figure 9:
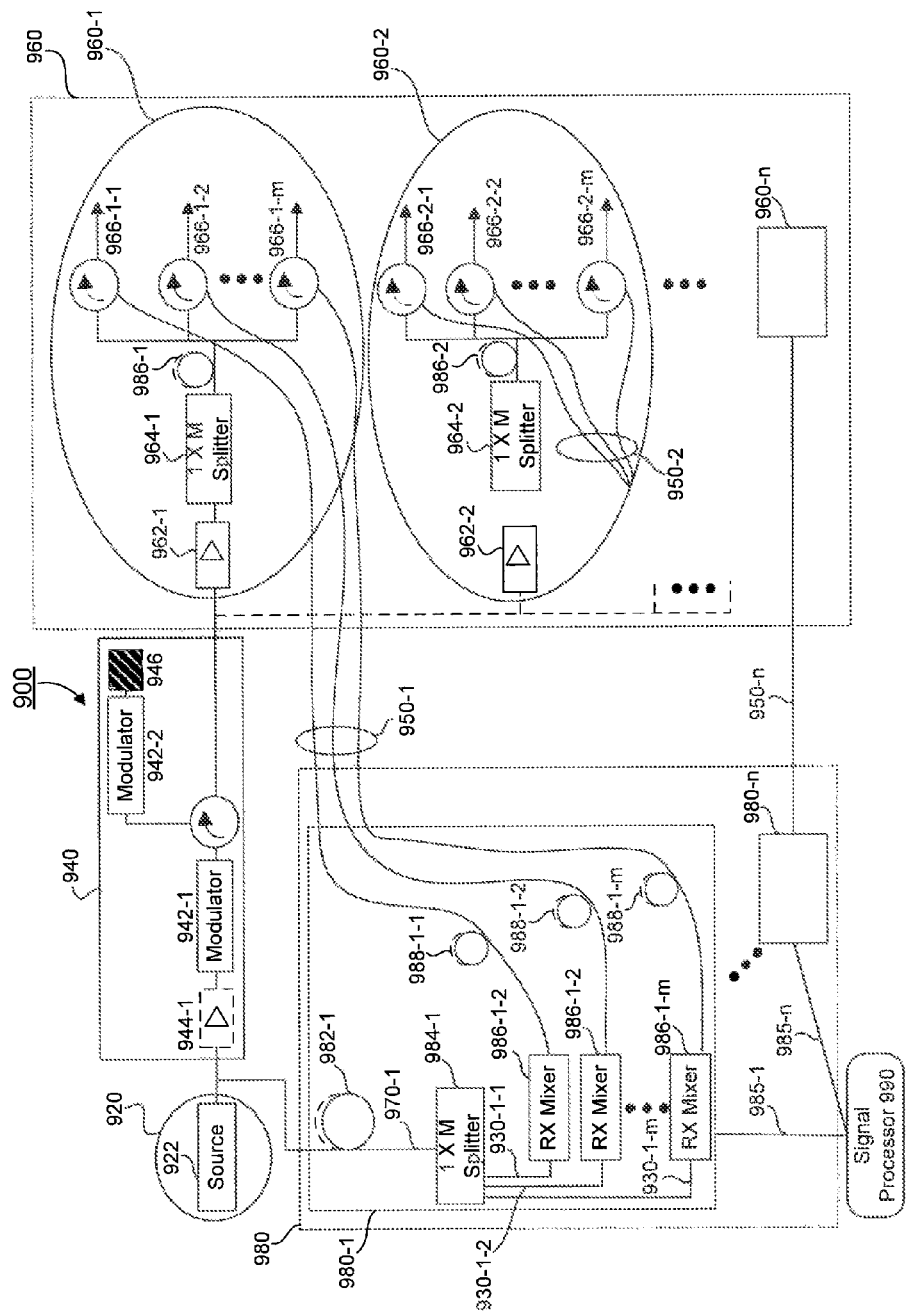

FIGS. 7, 8, and 9, illustrate various embodiments of laser Doppler velocimeters with multiple transceivers.

Figure 10:
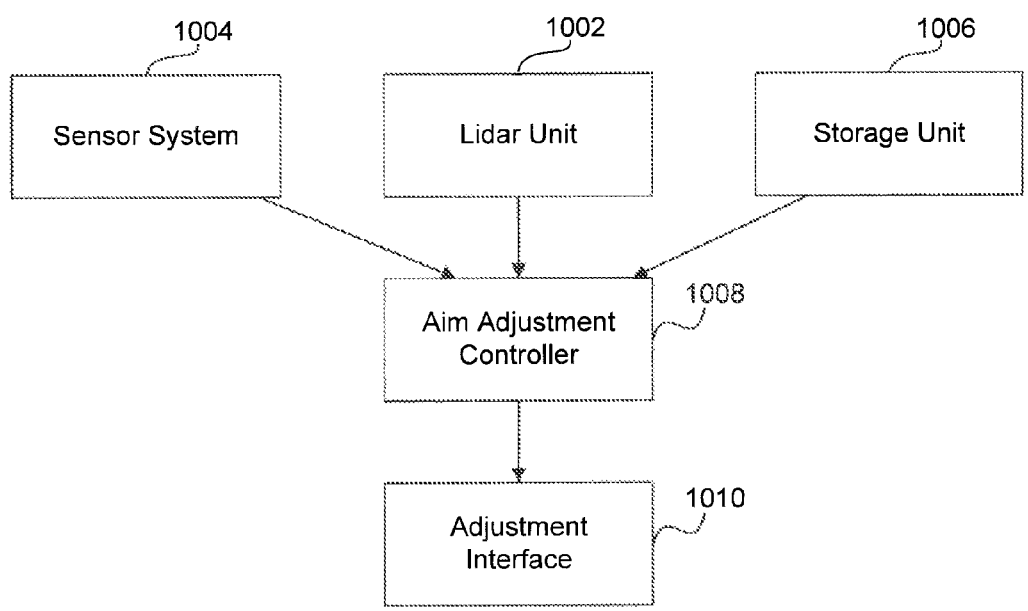

FIG. 10 illustrates an apparatus including a LIDAR system, according to an embodiment.

Figure 11B:
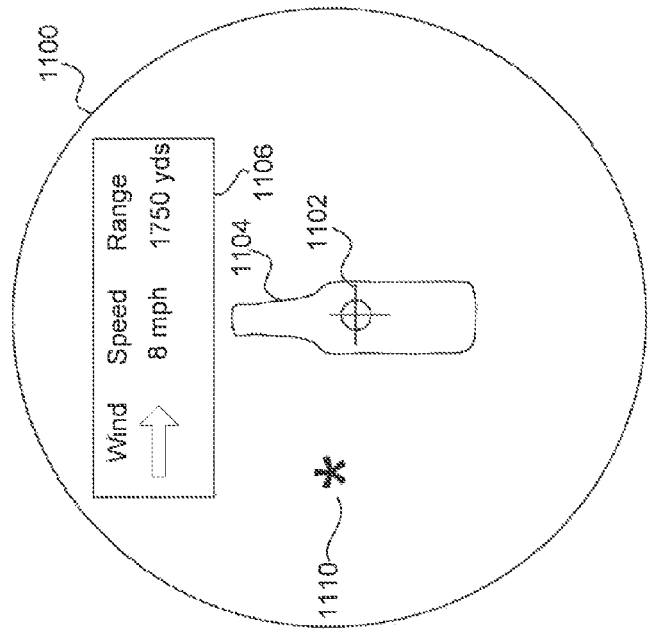
Figure 11A:
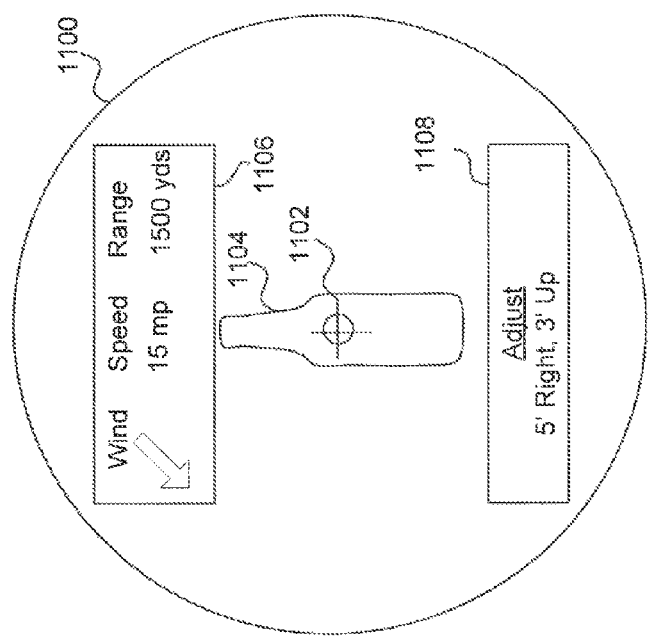

FIGS. 11A-B illustrate embodiments of a scope view with aiming adjustments.

Figure 12:
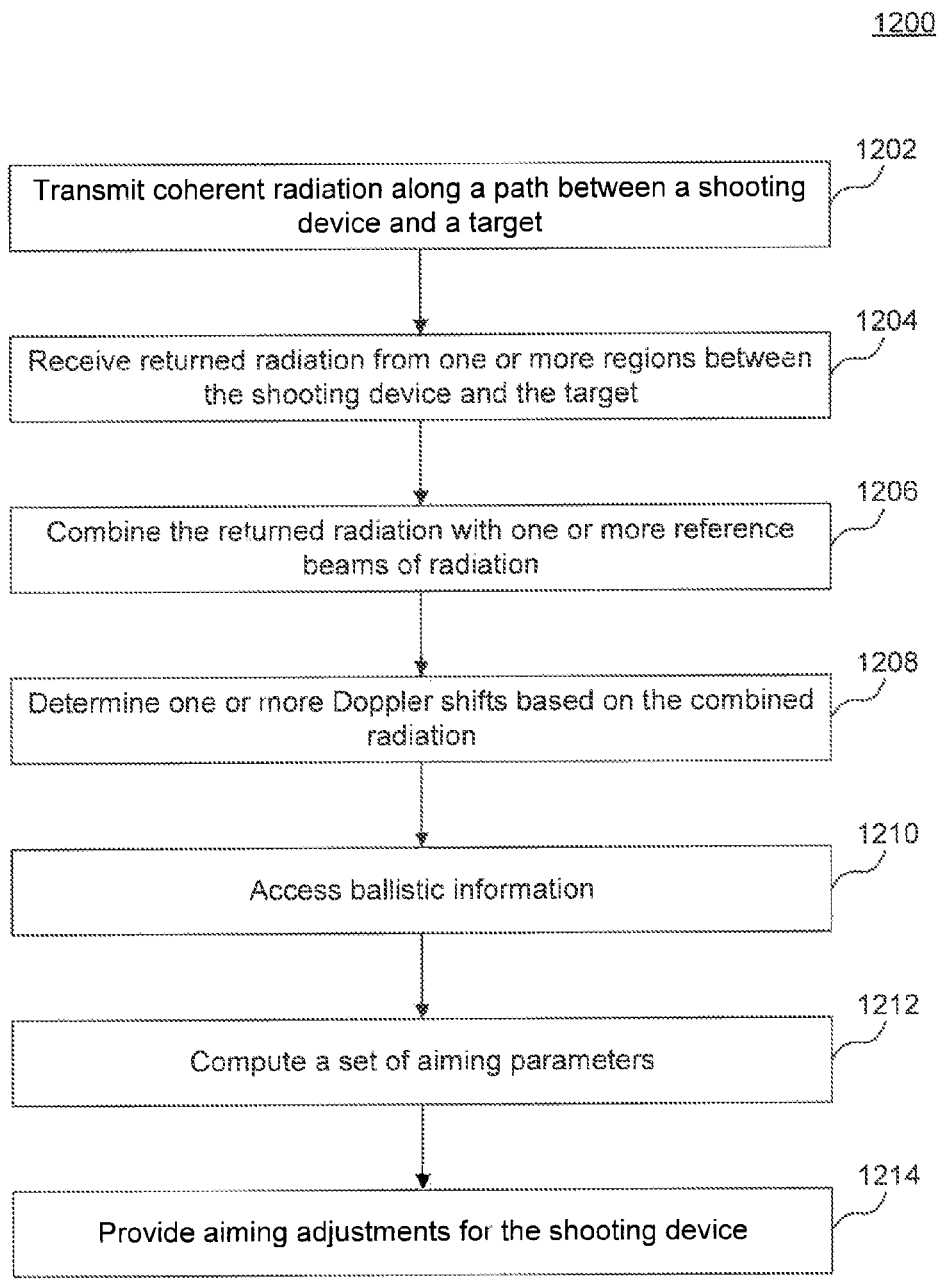

FIG. 12 illustrates a flowchart depicting a method, according to an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

LIDAR systems, such as laser Doppler velocimeters ("LDVs"), transmit light to a target region (e.g., into the atmosphere) and receive a portion of that light after it has scattered or reflected from the target region or scatterers in the target region. This received light is processed by the LDV to obtain the Doppler frequency shift, $f_D$. The LDV conveys the velocity of the target relative to the LDV, v, by the relationship $v=(0.5)cf_D/f_t$, where $f_t$ is the frequency of the transmitted light, and c is the speed of light in the medium between the LDV and the target. LDV's are have a wide range of applications including, but not limited to: blood-flow measurements, speed-limit enforcement, spaceship navigation, projectile tracking, and air-speed measurement. In the latter case the target consists of aerosols (resulting in Mie scattering), or the air molecules themselves (resulting in Rayleigh scattering).

In embodiments of the present invention, a LIDAR system is used in cooperation with various other sensors and information to improve the accuracy of an aiming device of a weapon. In an embodiment, the LIDAR system is mounted on the weapon allowing a shooter to use the weapon and LIDAR system in conjunction with each other during final aiming procedures. Thus, in one example, the weapon includes a body, a barrel and an aiming system coupled to the body. In another embodiment, the LIDAR system is a handheld system operated separately from the weapon. The handheld system may be used by a spotter to provide a higher degree of portability. In one example, the LIDAR system may be wired or wirelessly coupled to the aiming system of the weapon. The weapon for use with the LIDAR system is typically a long-range weapon, such as a sniper rifle or mortar device, since the long ammunition travel distance yields a higher sensitivity to environmental conditions. However, any ranged weapon can be considered for use such as a side firearm, crossbow, grenade launcher, etc.

In an embodiment, the LIDAR measurement system and weapon are coupled together on a platform mounted to a vehicle, such as, for example, a tank, ATV or truck. In another example, the LIDAR system and weapon are coupled together on a ship or other related sea vessel. In another example, either the LIDAR system or weapon can be stationary while the other is aboard a moving platform of any type.

In an embodiment, a LIDAR system may be used to measure speed, velocity and direction of winds at one or more distances between the shooter and the target. In another embodiment, the LIDAR system determines other characteristics, such as temperature, humidity and air pressure.

Figure 1:
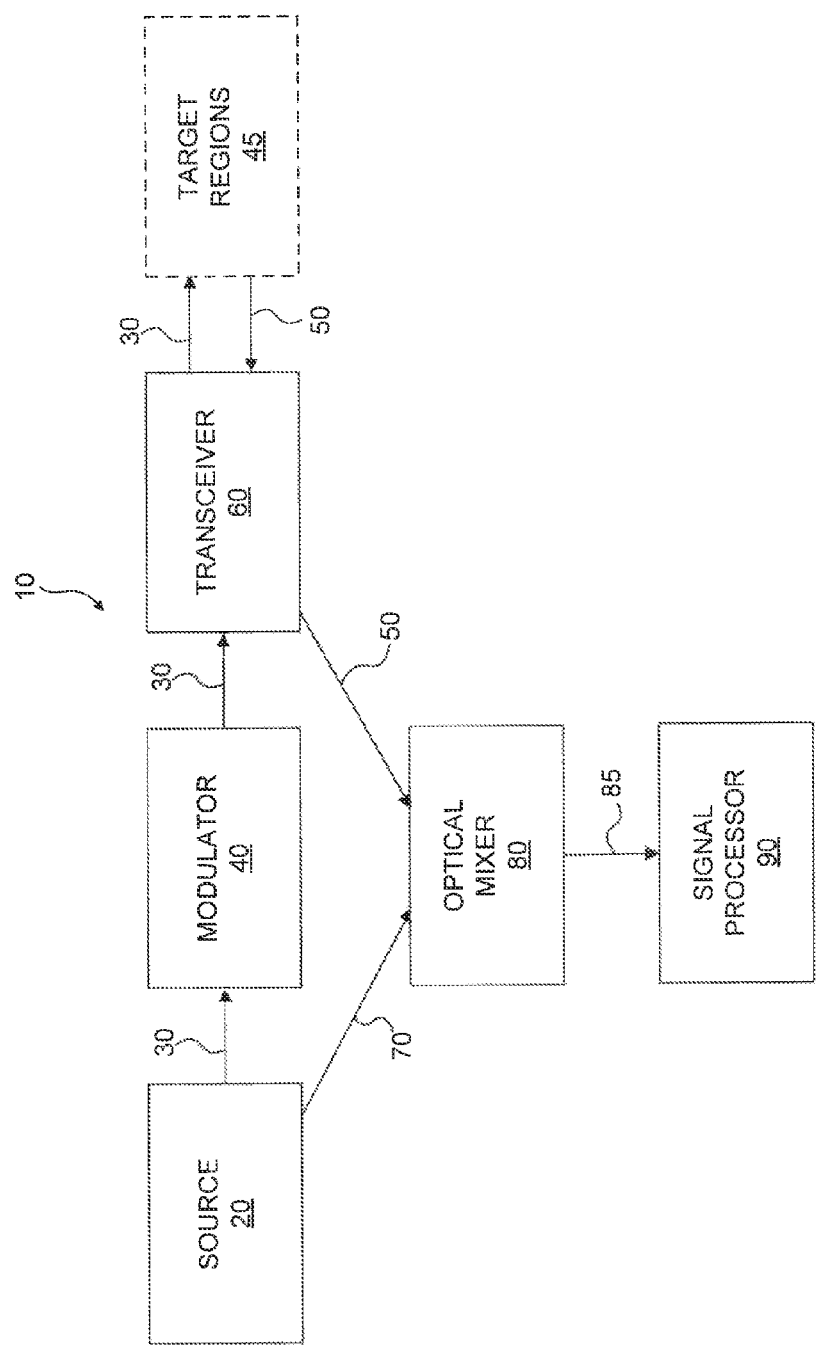
FIG. 1 illustrates a LIDAR system, according to an embodiment.

FIG. 1 illustrates a LIDAR system 10. For example, LIDAR system 10 can be similar to the LIDAR system disclosed in U.S. Pat. No. 5,272,513. Additional exemplary systems are taught in co-owned U.S. application Ser. No. 12/988, 248 (U.S. Pub. App. No. 2011-0037970), Ser. No. 13/026,932 (U.S. Pub. App. No. 2012-0206712), Ser. No. 13/116,621 (U.S. Pub. App. No. 2011-0292371), Ser. No. 13/628,704 and PCT Publication No. WO 2009/134221, which are each incorporated by reference herein in their entireties. In one example, LIDAR system 10 includes a source, 20, a modulator 40, a transceiver 60, a optical mixer 80, and a signal processor 90. In one example, each path between elements comprises a waveguide, e.g., fiber optic, instead of free space.

In one example, LIDAR system 10 includes a source 20 of coherent light which may, if desired, be polarized. Source 20 projects a first coherent beam of light 30. Light 30 is received at modulator 40, e.g., also called a beam shaper. Beam shaper 40 can be used to expand and/or collimate beam 30. Light 30 exiting modulator 40 is received at transceiver 60. Transceiver 60 projects beam 30 in nearly collimated form into a target region 45. Target region 45 may, for example, be a region between a shooter and a target.

The collimated beam strikes airborne scatterers (or air molecules) in target region 45, resulting in a back-reflected or backscattered beam 50. A portion of backscattered beam 50 is collected by transceiver 60 or to an adjacent receiver (not shown). The case where the same transceiver transmits and receives the light is known as a monostatic configuration, while the case of separate transmitters and receivers is known as a bistatic configuration. Monostatic configurations can only receive backscattered light. Bistatic configurations can be arranged to receive light that is substantially backscattered or at any other angle relative to transmitted beam 30.

Backscattered beam 50 is collected by transceiver 60 is then directed by transceiver 60 to mixer 80. Mixer 80 combines a separate reference beam of light 70 with beam 50. An ideal optical mixer combines the two beams in such a way that they have the same polarization and occupy the same space, and directs the result onto a photo detector with a bandwidth sufficient to detect the measured Doppler frequency shift. The photo detector produces an electrical current 85, which includes a component whose frequency is the mathematical difference between the frequency of the reference beam 70 and the backscattered beam 50. The electrical current 85 is then analyzed by a signal processor 90 (e.g., electrical spectrum analyzer or a frequency counter) to determine the Doppler frequency shift and calculate the relative velocity component along the axis of transceiver 60 between LIDAR system 10 and target region 45.

Ambiguities regarding whether the measured relative frequency is either positive or negative can be resolved by using the "in-phase and quadrature" detection method, as is known in the art. Another approach to resolving these ambiguities is to apply a stable, constant frequency shift either to transmitted beam 30 or to reference beam 70 (e.g., by using an acousto-optic cell). This creates an alternating current component in the electrical signal 85 with a frequency that is the sum of the constant frequency shift and the Doppler frequency shift, removing the directional ambiguity.

A LIDAR system wherein the frequency of transmitted beam 30 and the frequency of reference beam 70 are identical is said to use homodyne detection. Heterodyne detection is used when the frequencies of transmitted beam 30 and reference beam 70 are different.

Reference beam 70 is selected to have a well-defined and stable optical frequency that bears a constant phase relationship with transmitted beam 30. This is known as coherence. The requirement for coherence is easily achieved by using a laser as source 20 and tapping source 20 to create reference beam 70 by means of an optical splitter (not shown).

Source 20 can be either a $CO_2$, Nd:YAG, or Argon Ion laser (preferably lasing in the fundamental transverse mode and in a single longitudinal mode). However, air-speed targets (aerosols and/at molecules) generate very weak return signals compared to solid objects. Thus air-speed LIDAR systems incorporating these laser sources that work over a range of hundreds of meters require large amounts of laser power and are thus too large, bulky, heavy, fragile and possibly dangerous to be used in many desirable applications. In an embodiment, source 20 produces emission wavelengths within the near-to-short infrared portion of the spectrum. In one example, source 20 produces radiation at 1064 nm. In another example, source 20 produces radiation at 1550 nm.

However, source 20 can also be a lightweight, low-cost, highly efficient, rare-earth-doped glass fiber (referred to hereafter as a fiber laser). Fiber lasers have several enormous advantages over other laser sources. Fiber lasers can be efficiently pumped by laser diodes whose emission wavelengths have been optimized for excitation of the rare-earth dopant. This makes the fiber lasers very energy efficient and compact, eliminating the need for cooling systems, flash lamps, and high current electrical sources. Moreover the glass fiber serves as a flexible waveguide for the light, eliminating the need for bulky optical components like mirrors and lenses that require rigid mechanical mounts in straight lines with stringent alignment tolerances. Fiber lasers are also more adaptable than solid-state lasers: the pulse repetition frequency ("PRF") and pulse width in fiber lasers may be changed "on the fly," while the PRF and pulse width in solid-state lasers are bound to narrow ranges or are even fixed. Source 20 can also be comprised of a laser diode coupled to an optical fiber. Embodiments of the present invention provide a LIDAR system with no moving parts and which is lightweight enough to be used for many different applications which were, up to this point, not practical. The disclosed LIDAR system includes an active lasing medium, such as e.g., an erbium-doped glass fiber amplifier for generating and amplifying a beam of coherent optical energy and an optical system coupled to the beam for directing the beam a predetermined distance to a scatterer of radiant energy. The reflected beam is mixed with a reference portion of the beam for determining the velocity of the scatterer.

In using this device to measure wind velocity in the transceiver focal volume, the velocity component that is measured is that component along the axis of the transceiver. Therefore, for measurement of the "n" components of velocity, n independent measurements must be made along n non-collinear axes (where n is an integer). To accomplish this task n duplicate transceivers are disclosed, each carrying either a continuous wave ("CW") beam or are simultaneously pulsed with a common seed laser source. Simultaneous pulsing and transmission through the n transceivers has the advantage that the velocity measurements each arise from the same moment in time, instead of from sequential moments in time. Thus, the resulting velocity determinations are more accurate as a result of simultaneous pulsing and transmission instead of sequential transmission.

By using optical fiber for both generation of the laser energy as well as wave guiding of the energy, the present disclosure provides a single, mechanically flexible conduit for light. This configuration allows the system to be more robust to vibration and temperature variation than a corresponding system comprising free space optical components. The only point at which light leaves the optical fiber system is for projection from the respective transceivers. Each of the optical fibers that transmits light is also the same fiber used to receive scattered fight and thus the aerosol-scattered return beam is automatically aligned with the respective transceiver-fiber optic collection systems.

The use of fiber lasers such as e.g., erbium-doped optical fiber also has advantages in terms of the overall energy efficiency of the system. Because diode lasers are now available at the optimal pump wavelength of erbium doped glass, the erbium wave guide can be efficiently pumped by launching pump radiation down this wave guide. Thus, the system has greatly reduced cooling requirements and can operate off of a low voltage battery supply.

The disclosed velocimeter system is also eye-safe, lightweight, and easily scaled to high energy per pulse or CW operation. As described above, the velocimeter has "n" lines of sight. Thus, in order to determine an object's velocity or the wind velocity in one or more target regions, n transceivers are used, each simultaneously projecting a beam of light along a different axis. To determine three-dimensional velocity, as with wind velocity, three transceivers are used. To determine two- or one-dimensional velocity, e.g., for a car or boat moving on a plane or in a line, fewer transceivers may be used. The laser beams projected from the n transceivers are each pumped simultaneously and arise from a single laser source. The source may be co-located with the n transceivers, or may be located remotely with respect to the n transceivers. If the laser source is remotely located, fiber optic cables are used to carry the generated light beams to each transceivers. As described below in greater detail, a seed laser from the source is amplified and if desired, pulsed and frequency offset, and then split into n source beams. The n source beams are each delivered to an amplifier assembly that is located within the n transceiver modules, where each of the n transceiver modules also includes an optical system such as a telescope. Amplification of the n source beams occurs at the transceiver modules, just before the n beams are transmitted through the optical system to one or more target regions. Thus, when the n source beams are conveyed through connecting fibers from the laser source to each of the n transceivers, the power of each of the source beams is low enough so as not to introduce non-linear behaviors from the optical fibers. Instead, power amplification occurs in the transceiver module, just before transmission from the optical system. Consequently, fiber non-linear effects are not introduced into the system.

The placement of the power amplifier within the transceiver modules just before laser beam projection through a lens reduces the effect of nonlinear fiber behavior that is normally observed when there is a greater propagation distance between the power amplifier and the lens. In this way, the disclosed LIDAR system is able to use a single seed laser and amplifier assembly that is remote from the power amplifier. The seed laser generates a beam that may be amplified, pulsed, and frequency shifted before the beam is split, if necessary, and directed to the remote power amplifiers. Power amplification only occurs just before transmission of the source beam through the lenses. Thus, as long as the amplified result is still within the linear operating region of the fiber to the remote amplifier, the disclosed LIDAR system avoids the problems associated with non-linear fiber operation.

By using the disclosed LIDAR system, object or wind velocities may be measured with a high degree of accuracy. Because the source laser is split into n beams, the measurements taken along all of the n axes are simultaneous. Additionally, splitting the source beam into n beams does not necessarily require that the source laser transmit a laser with n times the necessary transmit power, because each of the n beams are subsequently power amplified before transmission. The n beams may each be directed towards the same target region or may be directed to multiple target regions. A single beam may be used to simultaneously measure velocities at multiple points or span along a single axis. Additionally, the disclosed LIDAR system has no moving parts, and is thus of reduced size and improved durability.

It should be appreciated that the n transceivers of the LIDAR system coupled to a weapon may be used to perform other functions beyond measuring wind velocity. For example, three transceivers may be configured to transmit three beams for the purpose of measuring a three dimensional wind profile, while a fourth transceiver may be configured to determine the range between the shooter and the target. Other configurations are possible as well without deviating from the scope of the invention as would be known to a skilled person in the art. Additionally, wind profiles may be measured using the LIDAR system for applications other than aiming a shooting device, such as wide-area reconnaissance, weather mapping, enemy movement tracking, etc.

Figure 2:
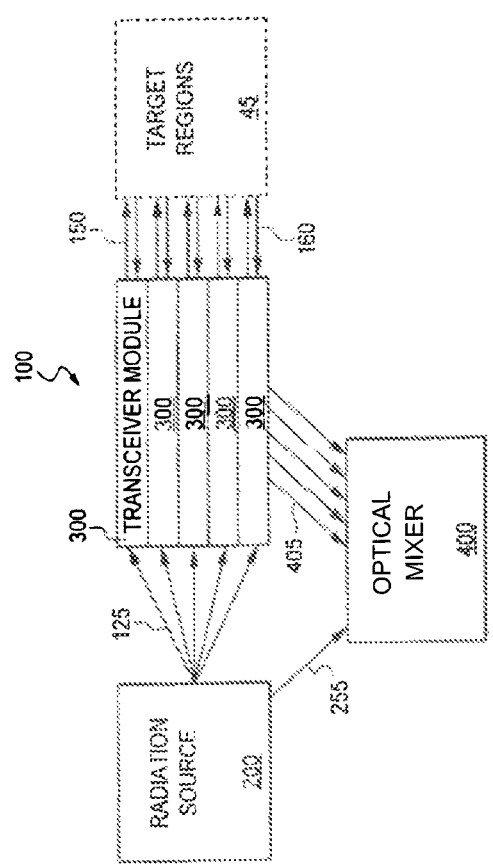
FIG. 2 illustrates an embodiment of a laser Doppler velocimeter with multiple transceivers.

FIG. 2 is a block diagram illustrating an n-axis laser Doppler velocimeter system 100. The system 100 includes a radiation source module 200, n transceiver modules 300, and an optical mixer 400. Each of the modules are described in detail below. The radiation source module 200 generates n source beams 125 to the n transceiver modules 300. The n transceiver modules 300 are for transmitting n beams of light 150 and receiving n scattered or reflected beams of light 160. The transceiver modules 300 may be located in a physically separate location than the radiation source 200 and the optical mixer 400. Alternatively, depending upon the application, all modules may be co-located. The radiation source module 200 also outputs a reference beam 255 to the optical mixer 400. The optical mixer 400 combines the reference beam 255 with each of the scattered/reflected beams 160 received by the n transceiver modules 300 that are passed on to the optical mixer 400 via optical fiber 405. Doppler shifts and hence, velocities, are calculated from the results of the combined signals.

Figure 3:
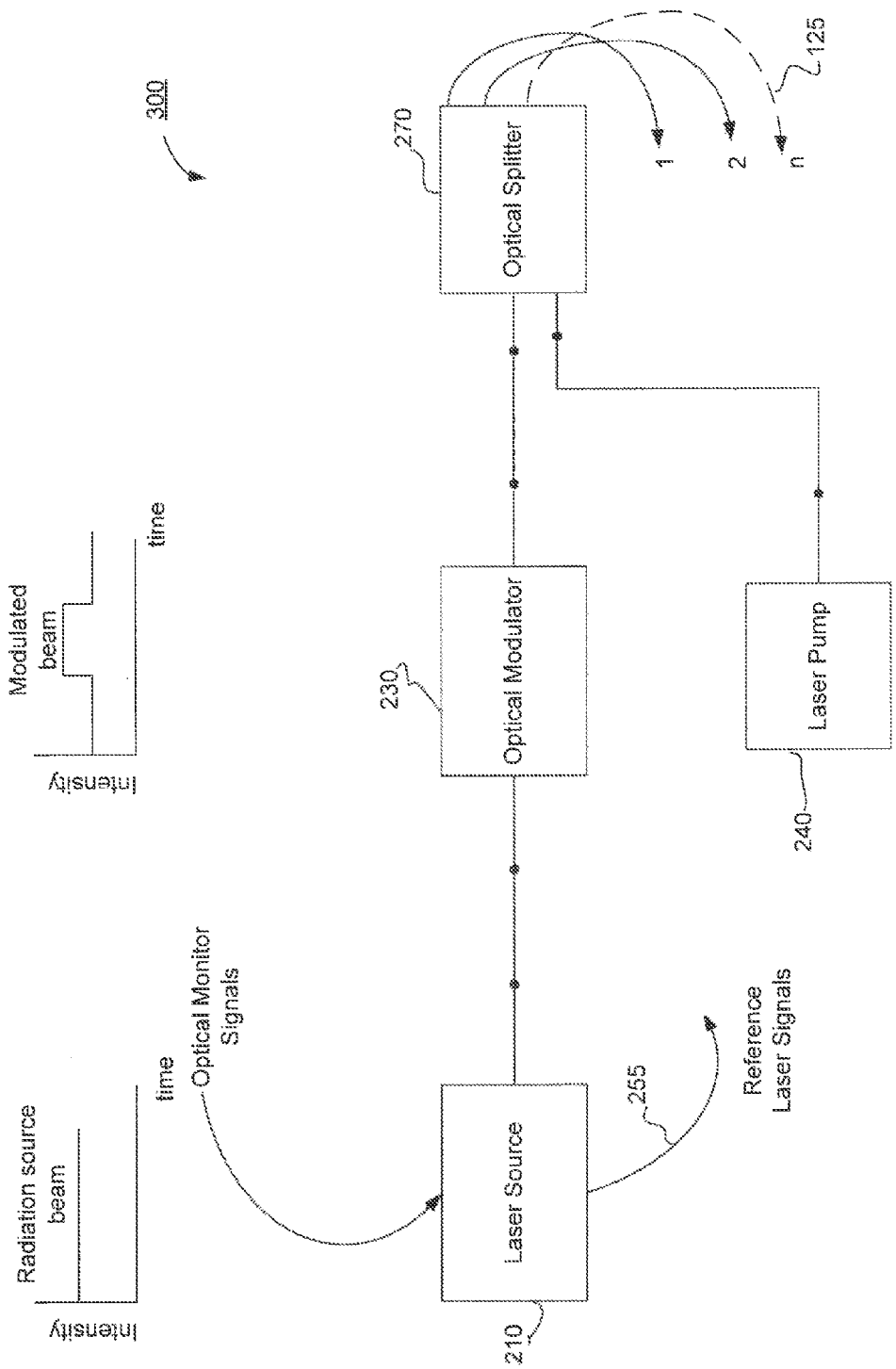
FIG. 3 illustrates an embodiment of a radiation source module of the laser Doppler velocimeter.

The radiation source module 200 is illustrated in FIG. 3. The radiation source module 200 includes a laser source 210, an optical amplifier (such as e.g., a fiber optic amplifier, illustrated a 330 in FIG. 4) and an optical splitter 270. The radiation source module 200 may also include an optical modulator 230 to provide a frequency shift (using e.g., an acousto-optic modulator), a polarization shift (using e.g. a Faraday rotator), or both, as well as to induce a temporal pulse shape (i.e. amplitude modulation).

Each of these components of the radiation source module 200 are coupled together and are described in greater detail below.

Figure 4:
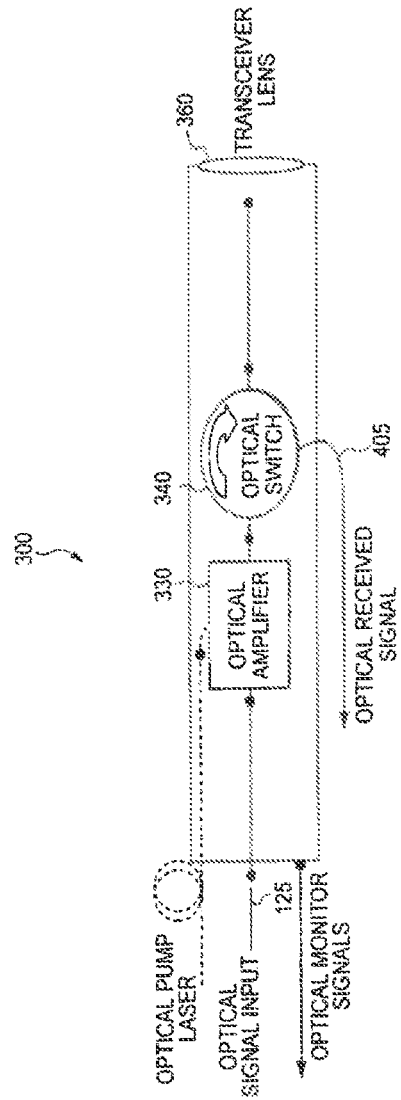
FIG. 4 illustrates an embodiment of a transceiver module of the laser Doppler velocimeter.

The laser source 210 and associated drivers and controllers provide the initial laser energy that may be feed into optical amplifier (see FIG. 4, feature 330). When the laser source output is combined with an amplifier, the result is a high power laser output. Typical laser sources 210 are small laser diodes (single-frequency or gain-switched), short-cavity fiber lasers, and miniature solid state lasers such as, for example, nonplanar ring oscillators ("NPROs"), or hybrid silicon lasers. The output from the seed laser source 210 is directed towards the optical modulator 230, that may induce a frequency shift, a polarization shift, or both as well as provide a temporal amplitude modulation. A reference laser signal 255 is also output from the laser source 210.

A frequency shifter (such as an acousto-optic modulator ("AOM")) (as a possible component of the optical modulator 230) and associated RF drivers may provide a radio-frequency ("RF") offset to the laser source output. This offset facilitates the later determination by a signal processor of the direction of any detected motion. The offset is provided by utilizing the acousto-optic effect, i.e., the modification of a refractive index by the oscillating mechanical pressure of a sound wave. In an AOM, the input laser beam is passed through a transparent crystal or glass. A piezoelectric transducer attached to the crystal is used to excite a high-frequency sound wave (with a frequency in the RF domain). The input light experiences Bragg diffraction at the periodic refractive index grating generated by the sound wave. The scattered beam has a slightly modified optical frequency (increased or decreased by the frequency of the sound wave). The frequency of the scattered beam can be controlled via the frequency of the sound wave, while the acoustic power is the control for the optical powers. In this way, a frequency shifter may be used to provide a frequency offset to the laser source output. An AOM may also be used as an optical modulator 230 to modulate laser signals from the source laser 210 in order to obtain pulsed LIDAR measurements.

Additional modulation of the seed laser output may be provided using an optical modulator 230 (such as e.g., semiconductor optical amplifier ("SOA")). Although the SOA is not necessary for the system 100 to function, SOA-induced pulsing may be used to optimize the extinction ratio in the pulses. The SOA is capable of providing primary as well as secondary modulation of the seed laser source. The SOA may also be used to provide optical amplification to the laser source signal. The laser source 210 can also be modulated electronically.

An optical amplifier (feature 330 in FIG. 4) can be either a semiconductor-based booster optical amplifier ("BOA") or a fiber optic amplifier. The fiber optic amplifier includes a length of fiber doped by a rare earth element such as e.g., erbium (Er), erbium-ytterbium (Er:Yb), etc. A single mode ("SM") or multimode ("MM") pump diode is used to excite the dopant material within the doped fiber. Optical signals from the SOA may be combined with the pump signals via a wavelength division multiplexer ("WDM") or a tapered fiber bundle ("TFB"). In the optical amplifier 330, the source light is amplified to a level below the power limit dictated by optical damage and nonlinear effects of the fiber. Amplifier spontaneous emission from the optical amplifier 330 is managed via the use of narrowband bulk filters or fiber Bragg grating ("FBG") based filters.

Once filtered, the amplified light is passed through an optical splitter 270. The optical splitter 270 splits the light amongst the different transceiver modules 300. As explained below, the light from the radiation source module 200 is transmitted to optical amplifiers 330 located within each individual transceiver module 300. The use of an optical splitter instead of a switch or multiplexer allows the radiation source module 200 to be designed without any moving parts. In other words, no motors or switches need be used.

Light output from the optical splitter 270 and hence the radiation source module 200 is directed to the n transceiver modules 300 by way of n connecting fibers 125. The connecting fibers 125 allow the radiation source module 200 to be remotely located (if desired) from the n transceiver modules 300. As described above, the lasers carried by the connecting fiber bundle 125 are each at a sufficiently low power to avoid introducing the non-linear effects of the fiber. The fiber bundle 125 consists of multiple fibers of varying core sizes to carry different optical signals between the radiation source module 200 and the n transceiver modules 300. These optical signals include the amplified source laser signal as well as a multimode pump laser signal from a pump laser 240 for the pumping of amplifiers at each of the n transceiver modules 300. Furthermore, optical signals including optical monitor signals from the transceiver modules 300 are carried back to the radiation source module 200. The optical monitor signals can trigger the shutdown of the radiation source module 200 in the event of a malfunction or error at the transceiver modules 300.

One of the n transceiver modules 300 is illustrated in FIG. 4. Each of the transceiver modules 300 includes an optical amplifier 330 (such as a fiber optic amplifier), an optical switch 340 (such as e.g., a fiber optic circulator), and a transceiver lens 360 used to transmit and receive optical signals from the target region 45 (of FIG. 2).

Amplified source laser signals from the radiation source module 200 transmitted via optical fibers 125 to each of the transceiver modules 300 are further amplified within each of the transceiver modules 300 via the optical amplifier 330. The optical amplifier 330 includes a rare earth doped fiber (such as e.g., Er:Yb double clad fiber). Pump light can be introduced into the rare earth doped fiber via a tapered fiber bundle ("TFB") in a co-propagating or counter-propagating manner relative to the seed laser signal from the radiation source module 200. The source laser signal is thus further amplified within the transceiver module 300. The output of the optical amplifier 330 is then directed towards an optical switch 340 via TFBs or WDMs.

The optical switch 340 (such as e.g., a fiber optic circulator) allows a single lens 360 to be used to transmit and receive light, thus allowing the sensor to operate in a monostatic geometry. In the case where multiple lenses are used (at least one for transmitting a light beam and at least one for receiving a reflected light beam, e.g., a bistatic geometry), the optical switch 340 may not be necessary. The optical switch 340 may also be used in conjunction with an amplified spontaneous emission filter. Such a filter might be bulk optic or an FBG based filter. Such a filter may be installed to maintain laser eye safety, as necessary. It is often the case that these filters divert the amplified spontaneous emission ("ASE") to another fiber optic. This diverted laser can be used to monitor the operation of the optical amplifier 330 to adjust the amplifier's power, or as a safety feature in remotely pumped applications. As a safety feature, a measurable drop in the diverted ASE could mean that the fiber cable has been severed and that the pump should be shut down immediately. Alternatively, to reduce ASE in pulsed applications, the pump lasers themselves may be pulsed in synchronization. Pulsing the pump lasers also reduces power consumption, thus facilitating the use of battery operated systems.

Source light that reaches the transceiver lens 360 is projected onto a target object or region 45 (of FIG. 2). Scattered or reflected light is returned to the transceiver module 300. The transceiver lens 360 collects the scattered light back into the fiber. In the case of monostatic operation, the transceiver lens 360 focuses light back into the transmit fiber where the scattered light is separated out from the transmit beam by the optical switch 340. Otherwise, for example, in the case of bistatic operation, the scattered light is focused into a different fiber. The collected scattered light is carried via fiber 405 to the receiving module 400 of FIG. 2.

Figure 5:
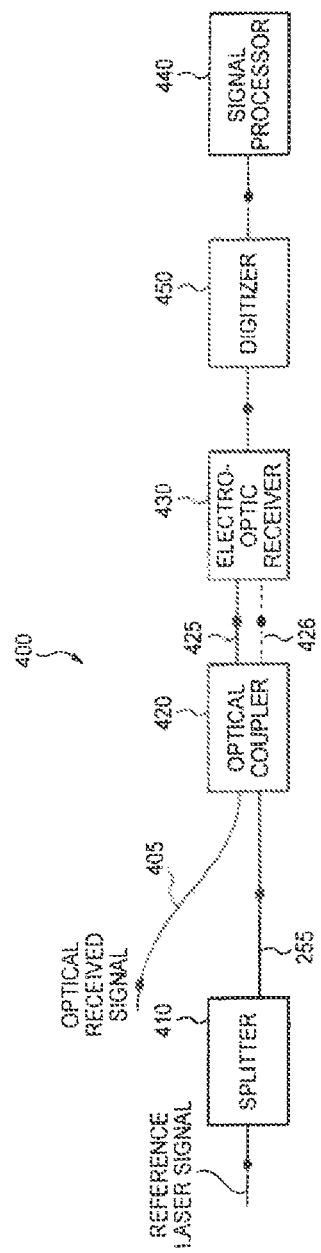
FIG. 5 illustrates an embodiment of a receiver module of the laser Doppler velocimeter.

The optical mixer 400 is explained in greater detail with reference to FIG. 5. The optical mixer 400 includes an optical coupler 420 (e.g. a fiber optic coupler) for combining the received signal 405 with the reference laser signal 255 into the same space (e.g., an output optical fiber). This combined signal 425 is then directed onto an electro-optic receiver 430 (e.g. a photodiode) that converts the mixed optical signal into an electrical signal. This signal is then digitized (via a digitizer 450) for convenient signal processing in order to extract the Doppler frequency shift (via a signal processor 440). If n transceiver modules 300 are used then the reference laser signal 255 must be split into n beams by splitter 410 for mixing with n optical mixers 400. If n is large, then an optical amplifier may be required to boost the power of the reference beam 255 before splitting.

An optical coupler such as 420 (e.g., a 3 dB fiber optic coupler) generally produces two output beams 425, 426 of opposite phase. Beam 425 is the combined signal, as explained above. Beam 426 may also be used and applied to a second electro-optic receiver to create a balanced receiver, as described in U.S. Pat. No. 4,718,121, the disclosure of which is incorporated herein by reference. Balanced receivers are preferably used because they use all of the mixed signal, and result in the cancellation of intensity noise in the reference laser beam 255.

Effective optical mixing also requires matching the polarizations of the received signal 405 and the reference laser signal 255. Mitigating the loss of mixing efficiency due to uncontrolled polarization may require a more complicated optical mixing circuit than the one shown in FIG. 5, such as a polarization diversity receiver, described in U.S. Pat. No. 5,307,197, the disclosure of which is incorporated herein by reference.

The signal processor 440 receives the signal from the digitizer 450 and converts the signal into frequency space, calculates line-of-sight speeds from the Doppler shifts along each line-of-sight (i.e., from each of the n transceivers 300), and combines these speeds to determine a single velocity for the target object or region measured. Additionally, the signal processor 440 may use input from a motion sensor (preferably an attitude heading reference system or an IMU and a GPS or ground speed detection device) to determine if the platform upon which the transceivers 300 are mounted is moving. Any platform motion is detected and used to adjust or correct the measured velocity, as described in connection with FIG. 6.

Although not all applications of the disclosed LDV 100 require platform motion compensation, the disclosed LDV 100 (or at least the transceiver module 300 of the LDV 100) is portable and may easily be located on a moving platform such as carried by a person or mounted to a moving weapon. As discussed above, the LDV 100 directly measures the relative motion of air scatterers with respect to the transceiver module 300 by detecting the Doppler frequency shift. If the LDV 100 is fixed to the ground, then its measurement is the wind speed and direction. However, an LDV 100 undergoing linear motion measures the relative wind speed and direction. If the linear speed and direction of the moving platform is known, then the wind speed can be extracted from the relative wind measurement. Additionally, the LDV 100 may undergo both linear and rotational motion as encountered on, for example, floating platforms, flying helicopters or other aircraft, etc. The rotational motion introduces an additional frequency shift since the optical focal volumes are moving rapidly through the air. This frequency shifts yields a speed measurement that is not necessarily useful to (1) meteorologists since it does not represent wind or (2) navigators since it does not represent relative wind. This rotational component must be isolated and compensated for in order to report useful wind data.

Figure 6:
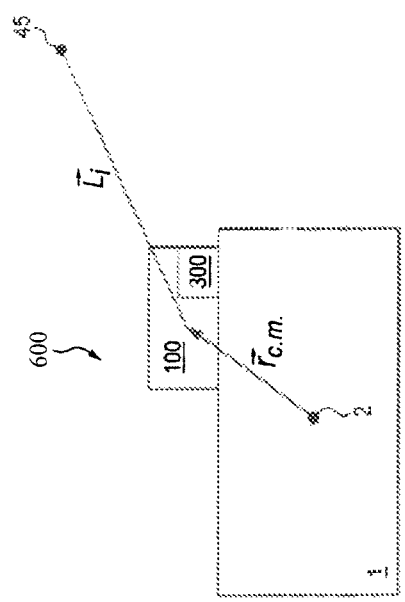
FIG. 6 illustrates a vector diagram of a motion compensation scheme for the laser Doppler velocimeter.

Referring to FIG. 6, a vector diagram of a motion compensation scheme 600 for the disclosed LDV is depicted. Platform motion of platform 1 is composed of linear translations of the platform's center of mass 2 and rotations about the center of mass 2. Mounted on the platform 1 is an LDV 100 with n transceiver modules 300. At least one of the n transceiver modules 300 (e.g., the $i^{th}$ transceiver module 300) is co-located with the LDV 100 on the platform 1. The velocity of the $i^{th}$ focal volume or target region 45 is given by Equation 1, below:

$$\vec{v}_{fi} = \vec{v}_{c.m.} + \vec{\omega} \times \vec{r}_i,\qquad \text{Eq. 1}$$

where $\vec{v}_{c.m.}$ is the linear velocity of the center of mass 2 of the platform 1 (and thus the LDV 100), $\vec{\omega}$ is the angular velocity of the platform 1, and $\vec{r}_i$ is the displacement vector from the center of mass 2 of the platform 1 to the ith focal volume or target region 45. The displacement vector is $\vec{r}_i = \vec{r}_{c.m.} + \vec{L}_i$, where $\vec{r}_{c.m.}$ is a vector from the center of mass 2 of the platform 1 to the transceiver modules 300 and $\vec{L}_i = f\hat{L}_i$, and is a vector from the ith transceiver module 300 to the ith focal volume or target region 45. The magnitude factor f is either the focal length in a focused system or the range in a range-gated system. The Doppler frequency shift created by this velocity is proportional to its component ($\delta_i$) along the laser line of sight $\hat{L}_i$: The $i^{th}$ Doppler frequency shift is equal to $2\delta/\lambda$, where $\lambda$ is the laser wavelength and:

$$\delta_i = \vec{v}_{fi} \cdot \hat{L}_i = \vec{v}_{c.m.} \cdot \hat{L}_i + (\vec{\omega} \times \vec{r}_i) \cdot \hat{L}_i.\qquad \text{Eq. 2}$$

The first term of Equation 2 (i.e., $\vec{v}_{c.m.} \cdot \hat{L}_i$) is the desired shift due to the relative linear motion between the $i^{th}$ target region 45 and the moving platform 1. The second term of Equation 2 (i.e., $(\vec{\omega} \times \vec{r}_i) \cdot \hat{L}$) represents the rotational motion and can be written as $(\vec{r}_{c.m.} \times \hat{L}_i) \cdot \vec{\omega}$ using the rules of cross products with the fact that $(\vec{\omega} \times \vec{L}_i) \cdot \hat{L}_i = 0$. The procedure for motion compensation in a three-dimensional system is to measure the three raw Doppler shifts and the angular velocity with an IMU, then subtract off $(\vec{r}_{c.m.} \times \hat{L}_i) \cdot \vec{\omega}$. This corrected frequency shift is used to compute the three-dimensional relative wind at the $i^{th}$ target region 45.

The angular velocity and attitude (pitch/roll angle) of a moving platform may change rapidly with time. It is important to measure the Doppler shift in a short amount of time so as to allow an assumption that the state motion is frozen (thus allowing the assignment of one value of angular velocity and attitude to each measured Doppler frequency shift). Accordingly, the laser pulse repetition frequency ("PRF") and the number of pulses $N_{acc}$ are chosen so that the total time of data collection (i.e., $N_{acc}$/PRF) is less than 200 milliseconds, for example. The angular velocity is measured before and after the $N_{acc}$ pulses are collected and the average value is used in the compensation calculations for $\vec{\omega}$.

Although LDV 100 has been described in reference to the system and module architectures depicted in FIGS. 2-5, these architectures are exemplary and are not intended to be limiting. For example, FIG. 7 illustrates an additional LDV architecture in the form of LDV 700. As in LDV 100 (of FIG. 2), LDV 700 includes a source module 720, a transceiver module 730 and an optical mixer 740. However, in LDV 700, the source module 720 does not include a splitter. Instead, radiation generated at the source module 720 is conveyed to the transceiver module 730, where the generated radiation is amplified by amplifier 732 and then split via splitter 734 for use by the n transceivers 736 in the transceiver module 730. In LDV 700, only one remote amplifier 732 is used instead of n remote amplifiers.

FIG. 8 illustrates an additional LDV architecture in the form of LDV 800. Here, LDV 800 includes a source module 820, one or more transceiver modules 830 and an optical mixer 840. The source module 820 does not include a splitter. Also, the transceiver modules 830 do not include amplifiers. Instead, an external amplifier 832 and splitter 834 are used. Radiation is generated at the source module 820 is conveyed to the remote amplifier 832 where it is amplified and then split via splitter 834 for delivery to the n transceiver modules 830. As in LDV 700 (of FIG. 7), only one remote amplifier 832 is used in LDV 800.

The disclosed LDV embodiments have been explained in the context of fiber-optic-connected modules in a way that allows the transceiver modules 300, 730, and 830 and optical amplifiers 330, 732, and 832 to be remotely located from the radiation source modules 200, 720, and 820. The transceiver modules 300, 730, and 830 need not include any electronics and can be purely optical modules. Motion compensation, laser sources, and signal processing occurs at the radiation source modules 200, 720, and 820 and optical mixers 400, 740, and 840. Thus, the operation of the transceivers 300, 730, and 830 is significantly improved due to less noise from the radiation source modules 200, 720, and 820 and receiver modules 400, 740, and 840, greater mounting stability and easier maintenance. It is to be understood, however, that the foregoing descriptions of LDVs 100, 700, and 800 are purely exemplary and are not intended to be limiting.

FIG. 9 illustrates a system 900, according to an embodiment of the present invention. In one example, system 900 includes a radiation source 920, a modulator 940, a transceiver 960, an optical mixer 980 and a signal processor 990. These elements may operate similarly to analogous features discussed above. In one example, one or more of modulator 940, transceiver 960, and mixer 980 may include multiple elements, i.e., one or more modulators, one or more transceivers, and one or more mixers, discussed in detail below.

In one example, source 920 is coupled to optical mixers 986-1-1 to 986-$n$-$m$ via respective paths 930-1-1 to 930-$n$-$m$, transceivers 960-1 to 960-$n$ are coupled to optical mixers 980-1 to 980-$n$ via respective paths 950-1 to 950-$n$, and optical mixers 980-1 to 980-$n$ are coupled to signal processor 990 via respective paths 985-1 to 985-$n$.

In one example, source 920 comprises a coherent radiation source 922, e.g., as a laser. In an example, laser 922 can be a fiber optic laser. In another example, laser 922 can be a rare-earth-doped fiber laser. In another example, laser 922 can be an erbium-doped fiber laser.

In an embodiment, laser 922 produces emission wavelengths within the near-to-short infrared portion of the spectrum. In one example, laser 922 produces radiation at 1064 nm. In another example, laser 922 produces radiation at 1550 nm.

In one example, modulator 940 includes one or more modulators 942-1 to 942-$n$, n being a positive integer. In one example, first modulator 942-1 can operate to introduce a temporal amplitude modulation. In an example, the temporal amplitude modulation induced by modulator 942-1 can be of the form of a pulse. In an example, the temporal amplitude modulation can be of the form of a square wave pulse. In an example, the temporal amplitude modulation can be of the form of a sequence of pulses. In an example, the temporal amplitude modulation can be of the form of a sequence of pulses each with fixed duration of a first time duration separated by a second time duration. In an example, the temporal modulation can be of the form of an arbitrary sequence of pulses of arbitrary shape and duration separated by arbitrary delays. In an example, the temporal amplitude modulation can be of the form of a sequence of square wave pulses.

In an example, modulator 942-1 can be a semiconductor optical amplifier (SOA). In another example, modulator 942-1 can operate to induce a frequency modulation so as to shift the frequency of the source radiation to a higher or lower frequency. In an example, modulator 942-1 can be an acousto-optic modulator (AOM).

In an example, modulator 942-2 can operate to introduce a polarization modulation. In an example, the polarization modulation can be a rotation of the linear polarization of the source radiation. In an example, the polarization modulation can be such as to change a linear polarization of the source radiation into elliptical polarization. In an example, the polarization modulation can change an elliptical polarization of the source radiation into a linear polarization. In an example, modulator 942-2 can be a birefringent crystal. In an example, modulator 942-2 can be coupled to a Faraday rotator 946. In an example, modulator 942-2 can be any device known in the art that operates to introduce a polarization modulation to the source radiation.

In one example, the use of first and second modulators 942-1 and 942-2 in series allows for a pulse amplitude modulation, such as a smaller pulse window (shorter duration and amplitude) within a larger pulse.

In an example, modulator 940 may also contain one or more optical isolators 944-$m$, where only isolator 944-1 is shown in FIG. 9. Optical isolators can be used to ensure that light propagates only in one direction along an optical fiber just as a diode in an electrical circuit ensures that current only flows in one direction.

In an example, transceiver 960 includes one or more transceiver modules 960-1 to 960-$n$. Each transceiver module 960-1 can include a splitter 964-1, one or more transceivers 966-1-1 to 966-1-$m$, m being a positive integer, and an optional delay 968-1. Splitter 964-1 can be a 1×m splitter, splitting a beam received from modulator 940 into m beams, one for each transceiver 966-1 to 966-$m$. Each of the transceivers 966-1-1 to 966-1-$m$ can comprise similar features and function similarly to transceivers 300 as shown in FIG. 4 and described above.

In one example, delays 968-1 to 968-$n$ are used to adjust the relative phases of the radiation input to transceivers 966-1-1 to 966-$n$-$m$ to account for differing path lengths between the various transceivers and source 920.

In one example, optical mixer 980 includes one or more mixer modules 980-1 to 980-$n$. For example, corresponding transceiver modules 960-1 to 960-$n$ are coupled via respective paths 950-1 to 950-$n$ to corresponding optical mixers 980-1 to 980-$n$. In one example, each mixer module 980-1 to 980-$n$ includes an optional delay 982-$n$ along path 930-$n$ coupled to source 920, a splitter 984-$n$, one or more mixers 986-1-1 to 986-1-$m$, and optional delays 988-1-1 to 988-1-$n$ coupled along paths 950-$n$ to respective transceivers 966-1-1 to 966-1-$m$ in respective transceiver modules 960-1 to 960-$n$.

In one example, delays 982-1 to 982-$n$ can be used to adjust the relative phases of the radiation input to mixers 980-1 to 980-$n$ to account for differing path lengths between the source and mixer modules 980-1 to 980-$n$ In one example, delays 988-1-1 to 988-$n$-$m$ can be used to adjust the relative phases of the radiation input to the various mixers 986-1-1 to 986-$n$-$m$ from the respective transceivers 966-1-1 to 966-$n$-$m$ to account for differing path lengths between the respective mixers and transceivers.

In one example, splitter 984-1 can split a beam from source 920 into m beams that travel to corresponding mixers 986-1-1 to 986-1-$m$ along respective paths 930-1-1 to 930-1-$m$. As discussed above, the optical mixers can measure a Doppler shift associated with radiation received by each transceiver 960 or 966 reflected back from the target regions relative to that of the source 920. Thus, the function of the beam splitters 984-$n$ is to provide reference signals from the source 920 to each of the mixers 986 that are needed in order to compare with the reflected radiation signal so as to measure a Doppler shift.

In one example, signals from each of the mixers 980-1 to 980-$n$ are received via paths 985-1 to 985-$n$ at signal processor 990. These signals can be the digitized form of the respective Doppler shifts calculated by the various mixers as described above with reference to FIG. 5. In an example, the signal processor 990 can calculate a velocity component associated with each transceiver 960 or 966.

FIG. 10 illustrates an embodiment of an aiming system 1000 which includes a LIDAR unit 1002 and various other components. LIDAR unit 1002 may be considered to be either LIDAR system 10 or multi-transceiver LIDAR system 900 as previously described. An aim adjustment controller 1008 collects data from LIDAR system 1000, sensor system 1004 and a storage device 1006 to calculate a set of aiming parameters, according to an embodiment. The set of aiming parameters may be applied to a weapon coupled with aiming system 1000 to substantially improve the accuracy, or may be transmitted in any form to a shooter operating the weapon. An adjustment interface 1010 is used to either relay the set of aiming parameters to the shooter or to control one or more actuators to perform autonomous aiming of the weapon.

Sensor system 1004 may include a variety of sensor inputs relating to conditions either surrounding aiming system 1000 or at some given distance away from aiming system 1000. For example, sensor system 1004 may include one or more visibility sensors, temperature sensors, humidity sensors or pressure sensors for measuring conditions and visibility range of the surrounding environment. Such sensors may be optical in nature, or include micromechanical elements, e.g. microresonators, etched diaphragms, piezoresistors, etc.

In a further embodiment, sensor system 1004 may also include sensors which measure the state of the weapon. For example, one or more accelerometers or gyroscopes may be included in sensor system 1004 to provide the cant of the weapon. In another example, internal temperature sensors may be included to provide any heat differences associated with the weapon.

Storage unit 1006 may contain information regarding the type of ammunition being used as well as the type of weapon being used, e.g., a ballistics database. Each ammunition type will have slightly varying wind drag characteristics based on shape, size, and weight. Similarly, a particular weapon will impose a given force upon the ammunition which may be different to the force imposed upon the same ammunition in a different weapon. Thus, a more accurate aiming model may be produced if the type of ammunition as well as the weapon type are known.

In an embodiment, storage unit 1006 may be preloaded with data regarding ballistics characteristics for a variety of ammunition and weapon types. Furthermore, data may be added to storage unit 1006 via a remote computer (not shown) through a communications interface, e.g. Bluetooth, WiFi, network cable, etc. Storage unit 1006 may be any known storage medium to those of skill in the art including, but not limited to, random access memory (RAM), flash memory, hard disk drive, etc.

In an embodiment, aim adjustment controller 1008 may select the ammunition and weapon type from storage unit 1006 based on input from sensor system 1004. For example, sensor system 1004 may include internal sensors which can identify the type of ammunition once it has been loaded into the weapon. In another example, sensor system 1004 includes sensors which identify the type of weapon being used based on, for example, size, weight, shape, or an identifying mark. In another embodiment, the shooter may input the type of ammunition and weapon being used via some interface coupled to storage unit 1006. Some examples of interfaces include, keyboards, display touchscreens, voice commands, etc. Once the type of ammunition and weapon being used are chosen, the information stored in storage unit 1006 associated with the chosen ammunition and weapon may be sent to aim adjustment controller 1008.

In an embodiment, aim adjustment controller 1008 receives as input data from one or more sensors included in sensor system 1004, wind profile data (e.g., direction, velocity, etc.) from LIDAR unit 1002, and ballistics data from storage unit 1006. Aim adjustment controller 1008 may use any of the data received to calculate a set of aiming parameters to substantially improve the accuracy of the weapon. In one example, aim adjustment controller 1008 receives data from a motion sensor coupled to the weapon. The motion sensor may provide weapon movement due to the weapon being on, for example, a water-based platform, a helicopter, or a land vehicle. The calculation may be performed by one or more processors executing an algorithm to provide a best-fit function based on the collected data.

The data received from LIDAR unit 1002 includes distinct wind profile data at multiple regions between the shooter and the target which provides for a much more accurate calculation than if the received, data only included an average of the wind speeds. The nature of the operation of LIDAR unit 1002 as previously described allows for a more detailed representation of the wind profile existing anywhere along a path between the shooter and the target.

In an embodiment adjustment interface 1010 is coupled to aim adjustment controller 1008 and applies the calculated aiming parameters so that they are made known to a shooter through some means. For example, adjustment interface 1010 includes voice commands which instruct a shooter where to aim their weapon to hit a target. In another example, adjustment interface 1010 includes text commands displayed on a screen or within a scope viewed by the shooter. The text commands include information from the calculated aiming parameters which instruct the shooter how to adjust the aim of the weapon to increase the probability of hitting the target. It should be understood that adjustment interface 1010 may also provide any of the data collected from sensor system 1004, LIDAR unit 1002 or storage unit 1006 via any of the means described above.

In another embodiment, adjustment interface 1010 controls one or more actuators coupled to the weapon to adjust the aim of the weapon based on the received aiming parameters. The movement of the weapon may be applied by one or more motors connected to servomechanisms. Alternatively, a platform upon which the weapon is mounted may be moved.

Various embodiments regarding the use of data received from LIDAR unit 1002 may be considered. For example, wind profiles may be collected at one or more ranges for reconnaissance, planning, or surveying purposes. In such a situation, no firing of a weapon is performed at the time of measurement. The collected data may be stored for future or historical analysis of the wind characteristics over an area, e.g., to generate a wind map of an area for subsequent use. Other uses of LIDAR unit 1002 may include weather mapping or tracking of enemy troop movements.

In one example, a ballistics database is accessed to determine a type of ammunition that could provide the best (e.g., most accurate) results given a measured wind profile of an area. In another example, the data may be used to model the wind characteristics over area and make determinations and predictions regarding future wind conditions for the area.

It should be understood that various components of aiming system 1000 need not be mounted to a weapon. For example, LIDAR unit 1002 may be a handheld device operated by a spotter separate from the shooter of the weapon. The spotter may use LIDAR unit 1002 to measure wind profiles over an area and then relay this information to the shooter. In another example, the spotter operates LIDAR unit 1002 and the information is wirelessly relayed to either the shooter or to a communications system coupled to the weapon. The spotter may collect data with other components as well, such as, for example, sensor system 1004.

FIGS. 11A and 11B illustrate views through a scope that display information related to the calculated aiming parameters, in accordance with embodiments. It should be appreciated that each figure depicts one example of an embodiment and any particular text, placement, or graphical representation related to each element should not be considered limiting.

The embodiments illustrated in FIGS. 11A and 11B may describe a situation in which the measuring and aim adjustments are performed at the time of shooting. Thus, the adjustments are made by the shooter on the weapon shortly before firing either from a weapons based measurement or measurements made by a device held by a spotter or other second party.

FIG. 11A includes a field of view 1100 which displays an example of what a shooter might see through the scope coupled to a weapon. In an embodiment, field of view 1100 includes a reticle 1102, a target 1104, a data window 1106, and an aim adjustment window 1108. The data window 1106 may include any of the data collected from sensor system 1004, LIDAR unit 1002 or storage unit 1006. For example, data window 1106 may provide the temperature and humidity of the environment or the current cant of the weapon. In another embodiment, data window 1106 displays data relating to a wind profile as collected from LIDAR unit 1002. Data window 1106 and aim adjustment window 1108 may be considered elements of adjustment interface 1010. One or both of data window 1106 and aim adjustment window 1108 may be digital images projected onto a surface within the scope, holographic projections, or be produced from thin LED elements such as OLEDs.

The wind profile may be associated with a particular range from the weapon or for one or more slices made at different distances from the weapon. Thus, the wind profile can be displayed for any range from the weapon up to a threshold range where the LIDAR unit no longer receives any backscattered radiation. The range for which the data is displayed may be adjusted by the shooter via a range control mechanism coupled to the weapon. The range control mechanism may be any adjustable component as would be known to one skilled in the art, such as a knob or slider. A graphic user interface may be utilized as well for adjusting the range, such as a display or touchscreen device. For example, the shooter may adjust the range to be 1500 yards from the weapon and would receive wind information in data window 1106 for that range. Note, that this does not mean that target 1104 is necessarily 1500 yards away, but that wind data is being displayed from a region that is 1500 yards away. Thus, an actual target can be farther or closer than a chosen range, and can be located opposite a blocking structure, e.g., building, tree, tent, etc., within the range. In another embodiment, data window 1106 displays the range to target 1104 measured from LIDAR unit 1002.

Aim adjustment window 1108 may provide the calculated aiming parameters in a format suited for a shooter to utilize for adjustments to the aim of the weapon. For example, aim adjustment window 1108 may display a number of degrees left, right, up, or down to either tilt or translate the weapon in order to hit a target originally positioned at the center of field of view 1100.

FIG. 11B includes field of view 1100 with a reticle 1102 aiming at target 1104, and may also include data window 1106. An electronic reticle 1110 may be displayed within field of view 1100, the placement of which is based on the calculated aiming parameters. For example, if the aiming parameters determine that the weapon needs to aim at a position 10 degrees left and 10 degrees up in order to hit target 1104, then electronic reticle 1110 may be displayed within the top left quadrant of field of view 1100. A shooter can align reticle 1102 with electronic reticle 1110 to adjust the aim based on the calculated aiming parameters and maximize the probability of hitting target 1104 with the first shot. Electronic reticle 1110 may be a digital image projected onto a surface within the scope, a holographic projection, or be produced from thin LED elements such as OLEDs.

FIG. 12 is a flowchart depicting a method 1200, according to an embodiment. For example, method 1200 can improve the accuracy of hitting a target. In one example, each of blocks 1202-1214 may be performed by an aiming system such as, for example, aiming system 1000. It is to be appreciated that not all of the blocks may be used for method 1200, and the blocks may occur in a different order than what is shown.

At block 1202, radiation is transmitted along a path between a shooting device and a target. In an embodiment, the radiation may be coherent and transmitted as a plurality of n beams, n being a positive integer. In an example, at least three of the plurality of n beams are used to develop a three-dimensional wind profile. In another example, at least one of the plurality of n beams is used to determine a range between the shooting device and the target.

At block 1204, return radiation is received from one or more regions between the shooting device and the target. The return radiation may be received via a same transceiver device that transmitted the coherent radiation at block 1202.

At block 1206, the returned radiation is combined with one or more reference beams of radiation.

At block 1208, one or more Doppler shifts are determined based on the combined radiation.

At block 1210, ballistic information is accessed. The ballistic information includes at least one of ammunition types and environmental conditions, according to an embodiment. Further information may be accessed at block 1210 as well, including, for example, temperature, humidity, and/or pressure of the surrounding environment. In one example, the ballistic information is accessed via a wireless communications link such as Bluetooth, WiFi, cellular, etc.

At block 1212, a set of aiming parameters are computed. In an embodiment, the aiming parameters are computed at least based on the Doppler shifts and the ballistic information.

At block 1214, aiming adjustments are provided for the shooting device. In an embodiment, the provided aiming adjustments substantially improve the accuracy of hitting the target. The aiming adjustments may be provided on a screen coupled to the shooting device. In one example, aiming adjustments are provided as text commands on the screen. In another example, aiming adjustments are provided as an electronic reticle on the screen.

It should be understood that the actions of blocks 1202 through 1206 may be performed by one or more LIDAR units. Additionally, the actions of blocks 1208 through 1214 may be implemented in hardware, software or any combination thereof. Additional actions may also be considered as part of method 1200. For example, the shooting device may be moved via one or more actuators based on the aiming adjustments provided in block 1214.

While specific embodiments of the present invention have been described above, it will be appreciated that the present invention may be practiced otherwise than as described. The description is not intended to limit the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An apparatus for improving accuracy of hitting a target comprising:
    a LIDAR unit configured to measure wind profile along a path between a shooting device and the target, and a range to the target;
    a storage device configured to store ballistic information for at least one of ammunition types, shooting devices, and environmental conditions;
    an aim adjustment controller configured to analyze the wind profile, the range to the target, and the ballistic information to determine a set of aiming parameters; and
    an adjustment interface configured to provide aiming instructions based on the set of aiming parameters, wherein the aiming instructions substantially improve the accuracy.

2. The apparatus of claim 1, further comprising a sensor system configured to measure one or more properties.

3. The apparatus of claim 2, wherein the one or more properties comprises at least one of a visibility, temperature, humidity, and pressure.

4. The apparatus of claim 2, wherein the sensor system comprises one or more accelerometers or gyroscopes.

5. The apparatus of claim 4, wherein the one or more accelerometers or gyroscopes are configured to determine the orientation or movement of the shooting device.

6. The apparatus of claim 2, further comprising a display configured to output the one or more properties.

7. The apparatus of claim 1, wherein the LIDAR unit is configured to measure the wind profile at a set range from the shooting device.

8. The apparatus of claim 7, further comprising:
    a range control mechanism,
    wherein the set range is adjustable via the range control mechanism.

9. The apparatus of claim 7, wherein the storage device is further configured to store the wind profile at the set range.

10. The apparatus of claim 1, wherein the LIDAR unit is configured to measure wind profiles at different ranges to determine each of the profiles at corresponding ranges.

11. The apparatus of claim 1, wherein the storage device is further configured to store the range to the target.

12. The apparatus of claim 1, further comprising:
    a communications interface,
    wherein the storage device is configured to upload data via the communications interface.

13. The apparatus of claim 1, further comprising:
    a display,
    wherein the adjustment interface comprises text commands on the display.

14. The apparatus of claim 1, further comprising:
    one or more actuators,
    wherein the adjustment interface is further configured to control the movement of the shooting device via the one or more actuators.

15. The apparatus of claim 1, further comprising:
    a display,
    wherein the adjustment interface comprises an electronic reticle displayed on the display.

16. The apparatus of claim 1, further comprising:
    a motion sensor,
    wherein the aim adjustment controller is further configured to compensate for a movement of the shooting device via input from the motion sensor.

17. A method for improving accuracy of hitting a target comprising:
    transmitting with a LIDAR a beam of radiation along a path between a shooting device and the target;
    receiving returned radiation from one or more regions between the shooting device and the target;
    combining the returned radiation with one or more reference beams of radiation;
    determining one or more Doppler shifts based on the combined radiation;
    wherein said Doppler shifts are used to develop a three-dimensional wind profile and a range between the shooting device and the target;
    accessing ballistic information for at least one of ammunition types, shooting devices, and environmental conditions;
    computing a set of aiming parameters based on at least the said three-dimensional wind profile and range between the shooting device and the target and ballistic information; and
    transmitting aiming adjustments to the shooting device to substantially improve the accuracy of hitting the target and wherein at least three beams of radiation are used to develop a three-dimensional wind profile and wherein a beam of radiation is used to determine a range between the shooting device and the target.

18. The method of claim 17, wherein the accessing comprises accessing ballistic information via a wireless communications interface.

19. The method of claim 17, wherein the accessing comprises accessing at least one of a humidity, temperature, and pressure of an environment around the shooting device.

20. The method of claim 17, further comprising displaying the aiming adjustments on a screen coupled to the shooting device.

21. The method of claim 20, further comprising displaying text commands on the screen.

22. The method of claim 20, further comprising displaying an electronic reticle on the screen.

23. The method of claim 17, further comprising moving the shooting device via one or more actuators based on the aiming adjustments.

24. The method of claim 17, further comprising compensating for a movement of the shooting device in the set of aiming parameters.

25. A shooting device, comprising:
   a body;
   a barrel; and
   an aiming system, comprising:
   a measuring device coupled to the body, the measuring device comprising a LIDAR unit configured to measure wind profile along a path between the barrel and a target, and a range to the target;
   a storage device electrically coupled to the measuring device, the storage device configured to store ballistic information; and
   an aim adjustment controller configured to analyze the wind profile, the range to the target, and the ballistic information to determine aiming parameters for the aiming system.

* * * * *